Aug. 25, 1942.                J. LEE                2,294,190
                        AUTOMATIC CLOSURE
                       Filed May 16, 1939            2 Sheets-Sheet 1
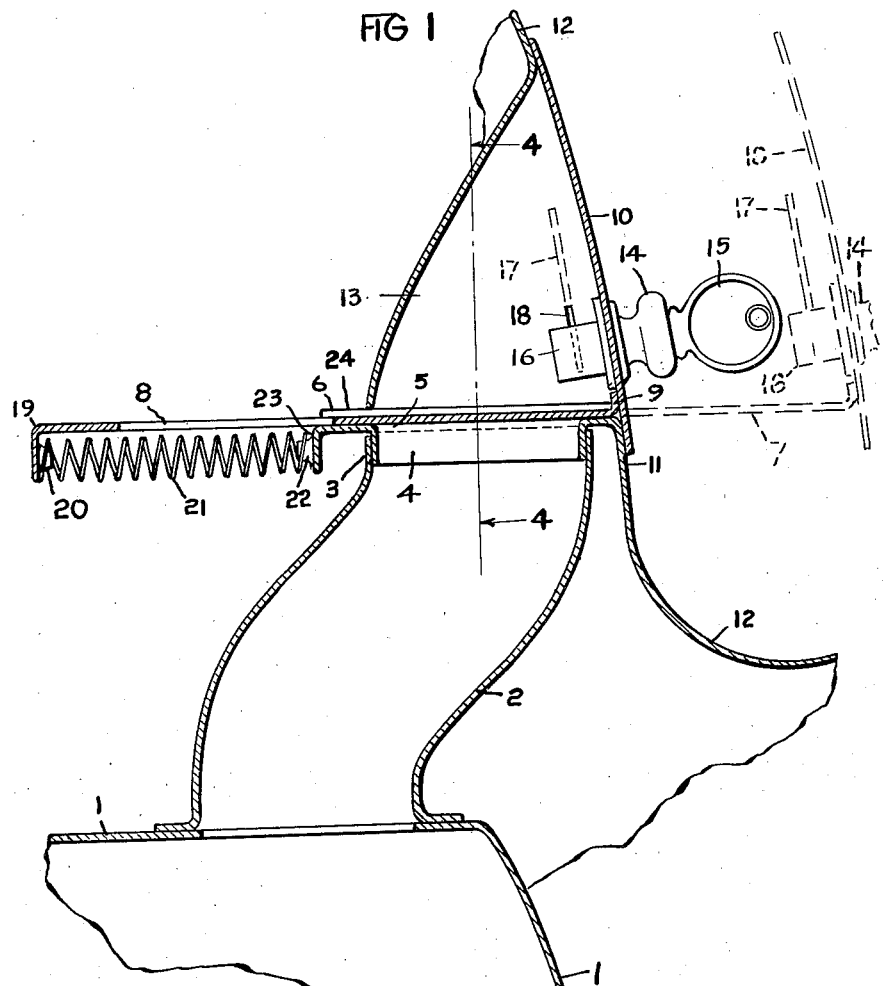
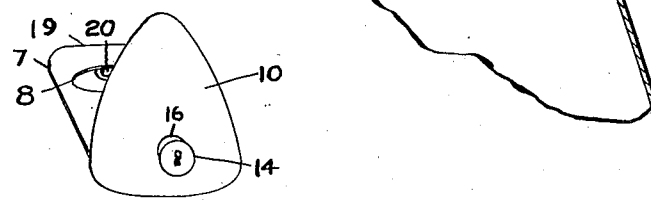
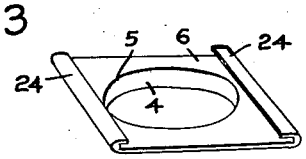
INVENTOR.
JOHN LEE.
BY Paul A. Talbot.
ATTORNEY.

Aug. 25, 1942.     J. LEE     2,294,190
AUTOMATIC CLOSURE
Filed May 16, 1939     2 Sheets-Sheet 2
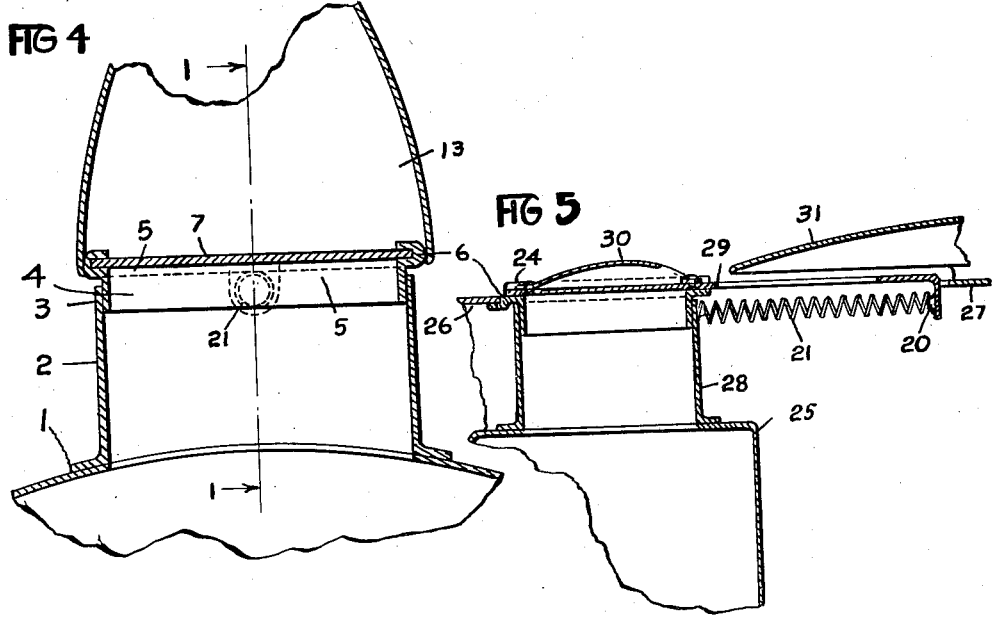
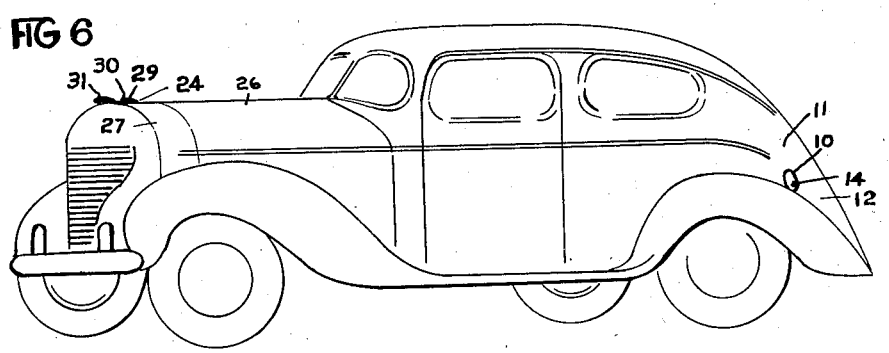
INVENTOR.
JOHN LEE.
BY Paul A. Talbot.
ATTORNEY.

Patented Aug. 25, 1942

2,294,190

UNITED STATES PATENT OFFICE 2,294,190

AUTOMATIC CLOSURE

John Lee, New York, N. Y.

Application May 16, 1939, Serial No. 273,867

1 Claim. (Cl. 220—86)

My invention relates to a device for closing the filling pipes for vehicles and particularly to a closure for vehicle fuel tanks and radiators and has among its purposes and objects to provide:

A closure or substitute for tank and radiator caps for vehicles in which a slide valve is used.

An automatic closing device for vehicle tanks, etc.

A closure for vehicle tanks, etc., which is substantially flush with and conforms to the surface of the body or hood of the vehicle.

A closure which is locked when closed.

A neat compact theft proof tank closure.

A device for closing the filling opening for fuel tanks which is secured to the vehicle and not removable.

A tank closure for vehicles which can not be lost.

I accomplish these and other objects by the construction herein described and shown in the accompanying drawings forming a part hereof in which:

Fig. 1 is a vertical section through my tank closure at 1—1 Fig. 4.

Fig. 2 is a perspective view of the slide and cover.

Fig. 3 is a perspective view of the tank fitting and guide.

Fig. 4 is a fragmentary section at 4—4 Fig. 1.

Fig. 5 is a modification and fragmentary section of a radiator closure.

Fig. 6 is a perspective view showing the application of my device.

Similar reference characters refer to similar parts throughout the several views of the drawings and in the specification to follow.

The caps for the tank openings of fuel tanks for vehicles and particularly for passenger automobiles are sometimes misplaced or lost and those that are threaded frequently become cross threaded and the threads so damaged that it is difficult to secure the cap properly. In the case of most fuel tanks the closure is easily removed by any one and thus the fuel is easily siphoned out while the vehicle is parked. Caps project beyond the surface of the body and do not add to the appearance of the finish of the vehicle and the leakage and also the fuel spilled on the finish damages it and gathers dust as well as adds to the fire hazard.

These disadvantages are overcome by the use of my closure as it is flush with the surface. The closure proper is inside the outer surface of the body. The cover is neat and hides the tank closure. Both the cover and closure are locked preventing theft and the parts are permanently secured to and form a part of the tank and body. The tank is automatically closed as soon as the filling pipe or hose end is withdrawn from the opening and the cover conforms to the surface of the body giving a neat and attractive appearance.

The caps for radiators have some of the disadvantages enumerated above relative to the caps for fuel tanks. My closure may be slightly modified to replace radiator caps and as the closure conforms to the fixed part of the hood the radiator may be filled without raising the hood. My closure can not be lost and automatically closes when the radiator is filled.

I have herein shown in detail the preferred construction and one of many modifications which after a study of the disclosure herein by one skilled in the art to which it pertains other modifications will be apparent to suit the numerous uses to which it is adapted. The various modifications can be made without departing from the principles embodied in and underlying my invention.

The tank 1 is provided with the filling pipe 2 the upper end 3 of which is secured to the depending flange 4 of the opening 5 in the guide plate 6 into which is slidably guided the valve plate 7 which in its closed position closes the opening 5 and when moved to its open position the opening 8 is brought into register with said opening 5 thereby providing a clear passage for inserting the end or nozzle of the filling hose not shown. The hose and its end may be of the type commonly used at gasoline or at other filling stations.

At the outer end 9 of the plate 7 I have provided the cover 10 shaped to conform to the surface 11 of the body 12 and of a size and shape to cover the pocket 13 in the side of the body. The cover is provided with the handle or knob 14 which receives the key 15 of the lock 16 having a latch 17 engaging the slot 18 in the side of the pocket 13 to lock the cover and plate in its closed position.

The inner end 19 of the plate 7 is turned downwardly to form the spring seat 20 which holds one end of the compression spring 21 in place. The opposite end of said spring is held on the spring seat 22 formed by flanging over a part of the inner end 23 of the guide plate 6. When the plate 7 is moved to open the tank the spring is overcome and upon release of the plate 7 and the cover 10 the spring returns these parts to their normal closed position automatically.

The sides of the upper surface of the plate 6 are turned up and over to provide the guides 24 which receive said plate 7.

The radiator 25 which is frequently concealed within the hood 26 or the fixed part 27 of the hood may be provided with the extension filling pipe 28 engaging the depending flange 4 of the guide plate 6 which receives the modified valve plate 29. The guide plate may be secured to or formed integral with the part 27 so that its upper surface is substantially flush with the hood and said part 27 so that when moved to its open position water or other cooling liquid may be added through the valve plate 29 without raising the hood. The valve plate may be provided with the ornamental pull piece 30 and the opening and the end having the spring seat may be concealed under the ornament 31 secured to the part 27. The spring 21 and the operation of the valve plate 29 is similar to the valve plate 7 except that no cover and lock is in this case provided.

Other modifications of my closure to suit the design of the parts of the vehicle to which it is applied may be made without departing from the features underlying my invention which I have herein shown and described in detail. I do not wish to be limited to the details of construction as I may wish to depart therefrom within the scope of the appended claim which sets forth my invention.

I claim:

In a self-closing tank closure for vehicles, an upwardly projecting filling pipe terminating adjacent the vehicle body and inwardly thereof, an apertured guide plate having a depending flange securing said guide plate to and across the upper end of said filling pipe and a valve plate apertured to register with the aperture in said guide plate when open and slidable inwardly out of register to normally close said filling pipe, spring seats depending from the inner edge of said guide plate and said valve plate and a spring held compressed between said spring seats to hold said valve plate in its normal closed position, a cover secured to the outer edge of said valve plate substantially perpendicular thereto, a knob on said cover providing a handle for sliding said valve plate to its open position, said spring adapted to move said valve plate to close said filling pipe, and a pocket in the side of the vehicle positioned above said guide plate and the end of said filling pipe, said pocket being covered by said cover, said cover being curved to conform to the curved surface of the vehicle body, and locking means securing said cover and valve against movement and permitting the movement of said cover and said valve plate when unlocked.

JOHN LEE.